DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 14, 1972

896 O.G. 422

T896,034
FILM FORMING POLYMERIC COMPOSITIONS
Frederick L. Hamb and John C. Wilson, both of
1669 Lake Ave., Rochester, N.Y. 14650
Filed May 7, 1971, Ser. No. 141,398
Int. Cl. G03c *1/78*
U.S. Cl. 96—87 R
No Drawing. 28 Pages Specification

Novel, high molecular weight polymers containing 3,6-dihydroxy-9,9-dimethylxanthene units are useful in the preparation of photographic film bases.